May 19, 1953 — H. W. MULCAHY — 2,639,044
FRICTION SHOCK ABSORBER FOR RAILWAY DRAFT RIGGINGS
Filed March 30, 1950
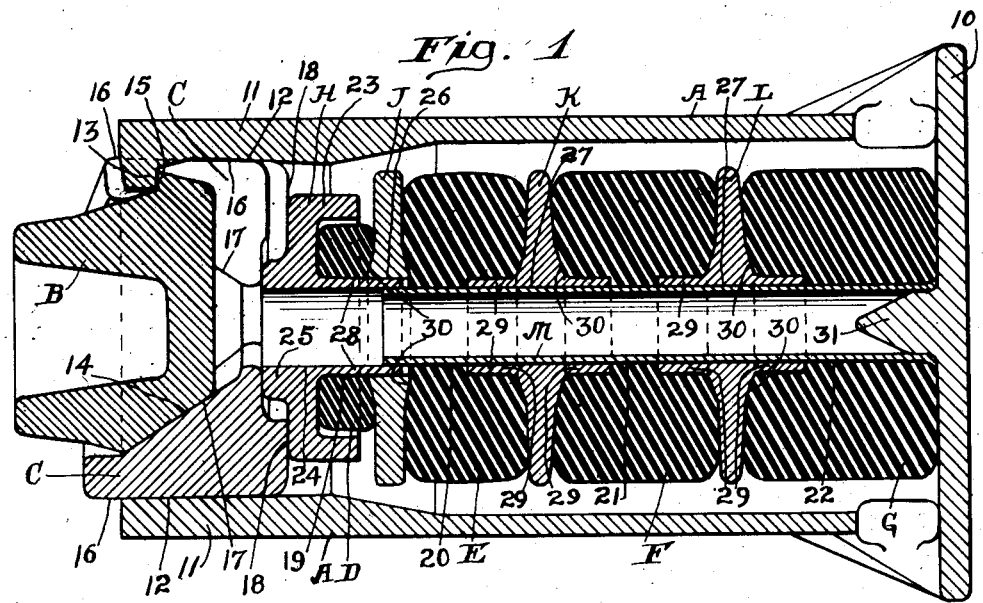
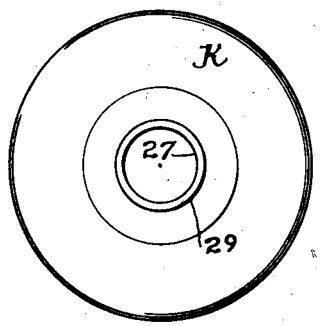
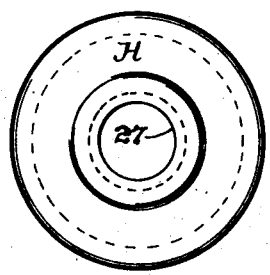
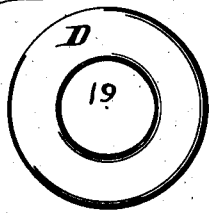
Inventor:
Harry W. Mulcahy
By Henry Fuchs
Atty.

Patented May 19, 1953

2,639,044

UNITED STATES PATENT OFFICE 2,639,044

FRICTION SHOCK ABSORBER FOR RAILWAY DRAFT RIGGINGS

Harry W. Mulcahy, Chicago, Ill., assignor to W. H. Miner, Inc., Chicago, Ill., a corporation of Delaware Application March 30, 1950, Serial No. 152,795

1 Claim. (Cl. 213—45)

This invention relates to improvements in friction shock absorbing mechanisms especially adapted for railway draft riggings.

One object of the invention is to provide a shock absorbing mechanism comprising a friction casing, friction shoes slidingly telescoped within the casing, a wedge pressure transmitting member having wedging engagement with the shoes, and yielding means within the casing opposing inward movement of the shoes, wherein the yielding means is composed of a plurality of rubber cushioning blocks, arranged in series and alternated with metal spacing members, and wherein means is provided for preventing biasing of the series of blocks as the mechanism is being compressed.

A more specific object of the invention is to provide a mechanism as set forth in the preceding paragraph, wherein the means for preventing biasing of the series of rubber blocks is in the form of a longitudinally extending, central guide member extending through and having a sliding fit within guide openings in the blocks and spacing members.

Other objects of the invention will more clearly appear from the description and claims hereinafter following.

In the accompanying drawing forming a part of this specification, Figure 1 is a horizontal, longitudinal sectional view of my improved friction shock absorbing mechanism. Figure 2 is an end elevational view of Figure 1, looking from left to right in said figure. Figure 3 is an elevational view of one of the metal spacing members shown in Figure 1, looking from left to right in said figure. Figure 4 is an elevational view of the follower member shown in Figure 1, looking from left to right. Figure 5 is an elevational view of the rubber block at the left hand end of the mechanism, as shown in Figure 1, and looking from left to right in said figure.

As shown in the drawing, my improved shock absorbing mechanism comprises broadly a friction casing A, a wedge block B, three friction shoes C—C—C, four rubber blocks D, E, F, and G, a follower H, metal spacing members J, K, and L, and a guide or centering tube M.

The casing A is in the form of a hollow, tubular member, open at the front end and closed at its rear end by a transverse wall 10, which is extended laterally outwardly beyond the sides of the casing to provide a rear follower member, which is integral with the casing and cooperates with the usual rear stop lugs of the center sills of a railway car. The casing A is a hexagonal, interior and exterior, transverse cross section and the walls thereof are inwardly thickened at its front or open end. This thickened wall portion of the casing provides the friction shell proper 11 of the same, presenting three inwardly converging friction surfaces 12—12—12 of V-shaped, transverse cross section, each friction surface 12 being formed by the interior faces of two adjacent walls of the hexagonal casing. At the open end, the casing A is provided with three inturned stop lugs 13—13—13, which are alternated with the V-shaped friction surfaces of the casing, the same being at the corners between adjacent of said V-shaped surfaces.

The wedge B is in the form of a block having a set of three wedge faces 14—14—14 at its inner end, which are arranged symmetrically about the central longitudinal axis of the mechanism and converge inwardly thereof. Each wedge face 14 is of V-shaped, transverse cross section. At its inner end the wedge B has three laterally outwardly projecting radial lugs 15—15—15, which are alternated with the wedge faces 14—14—14. In other words, the lugs 15 are arranged so that they are located between adjacent wedge faces and extend between adjacent shoes C—C to engage in back of the lugs 13 of the casing to restrict outward movement of the wedge block B and hold the parts of the mechanism assembled. The front end of the wedge block B receives the actuating force, bearing on the usual front follower, not shown, of the draft rigging.

The friction shoes C—C—C are interposed between the faces 14—14—14 of the wedge block B and the friction surfaces 12—12—12 of the casing A. The three shoes are of similar design, each having an outer, longitudinaly extending, V-shaped friction surface 16 engaged with one of the friction surfaces 12 of the casing, and having a lateral enlargement on its inner side, presenting a wedge face 17 of V-shaped, transverse section engaging the corresponding V-shaped wedge face 14 of the wedge block B. The extreme inner ends of the shoes, beyond the enlargements thereof, present transverse, flat abutment faces 18—18—18 on which the follower H bears.

The rubber blocks D, E, F, and G are arranged in series and form cushioning means within the casing, which yieldingly opposes inward movement of the shoes C—C—C. The block D, which is at the front or left hand end of the series, as seen in Figure 1, is seated in the follower H, which bears on the shoes C—C—C.

The blocks D, E, F, and G are all of substantially circular cross section, the block D being of considerably lesser volume and of smaller diameter than the blocks E, F, and G. The block E is of lesser volume than the block F and the latter is of lesser volume than the block G. Each block is provided with a central bore or opening therethrough, these openings of the blocks D, E, F, and G being indicated, respectively, by 19, 20, 21, and 22.

The follower H, within which the block D is seated, is in the form of a cup-shaped member, having a rearwardly extending, peripheral flange 23 which overhangs the block D. The follower H is provided with a central opening or bore 24 extending therethrough, as clearly shown in Figure 1. At its forward side, the follower H bears on the flat faces 18—18—18 of the shoes C—C—C and is provided with a forwardly extending, tubular, cylindrical flange 25 surrounding the opening 24, which flange is engaged between the shoes. This follower further has a rearwardly extending, elongated, tubular, flangelike section 28, surrounding the opening 24 and extending through the opening 19 of the block D and projecting rearwardly beyond said block.

The spacing members J, K, and L are interposed, respectively, between the blocks D and E, E and F, and F and G. Each member J, K, and L is in the form of a heavy metal washer having a central opening therethrough, the opening of the member J being indicated by 26 and those of the members K and L being indicated by 27. The openings 27—27 of the members K and L are surrounded by rearwardly and forwardly extending, tubular flanges 29—29 on said members, as clearly shown in Figure 1. As will be seen, the opening 26 of the member J is of larger diameter than the openings 27—27 of the members K and L and receives the projecting end of the tubular flange 28 of the follower H. The tubular flanges 29—29 of the members K and L are engaged in the openings 20, 21, and 22 of the blocks, these openings having the portions thereof which accommodate these flanges slightly enlarged, as shown in Figure 1. Sufficient clearance is left between the opposed outer ends of the flanges 29—29 of adjacent spaced members to permit full compression of the mechanism.

The main body portions of the members J, K, and L are thickened about the central openings thereof, thus providing relatively shallow, conical projections 30—30 at the front and rear sides thereof. The rubber block D has a flat front face bearing on the inner side of the cuplike follower H and has its rear side conically depressed at its central portion to accommodate the conical projection 30 at the forward side of the member J. Each of the rubber blocks E and F has conical central depressions at its front and rear sides to accommodate the corresponding projections 30—30 of the members K and L. The rubber block G has a central, conical depression in its front side within which the conical projection 30 at the rear side of the member L is seated. The rear side of the block G is substantially flat and bears on the inner side of the wall 10 of the casing.

The guide or centering tube M is of cylindrical cross section, as shown. This tube extends through the rubber blocks E, F, and G and the spacing members K and L, and has its front end slidingly telescoped within the tubular flange 28 of the follower H. This tube is held centered at its rear end by an inwardly projecting centering lug 31 on the wall 10 of the casing engaged within the rear end portion of said tube. The guide tube M is of such a diameter as to have a sliding fit within the openings 24, 26, and 27—27 of the follower H and the spacing members J, K, and L. As will be evident, the tube M forms a guide member which maintains the follower H, spacing members J, K and L, and rubber blocks D, E, F, and G in longitudinal alignment during compression of the mechanism, thereby preventing buckling or biasing of these parts, which might otherwise occur if such a guide member were not provided.

The operation of my improved friction shock absorbing mechanism is as follows: During compression of the mechanism, the wedge B is forced inwardly of the casing A, thus spreading the yieldingly resisted friction shoes C—C—C apart and sliding the same inwardly of the casing A on the friction surfaces 12—12—12 thereof, against the resistance of the rubber blocks D, E, F, and G. High frictional resistance is thus provided between the friction surfaces of the casing and the shoes.

I claim:

In a shock absorbing mechanism, the combination with a tubular casing closed at one end and open at the other end; of a follower slidable within the open end of said casing, said follower having a rearwardly projecting central boss thereon, said follower having a lengthwise disposed central bore extending therethrough and through said boss thereof; yielding means within the casing bearing at its front end on said follower and at its rear end on said closed end of the casing, said yielding means including a plurality of rubber blocks arranged in series, and spacing members alternated with said blocks, said blocks and spacing members having longitudinally aligned central bores, the boss of said follower extending into and slidingly fitting within the bore of the spacing member adjacent thereto; a centrally disposed tubular centering member projecting into the bore of the boss of said follower, said centering member extending through and snugly fitting the bores of said blocks and the bores of the spacing members which are beyond the spacing member adjacent said follower; and a tapered centering boss on said casing at said closed end thereof fitting within the corresponding end of the tubular centering member.

HARRY W. MULCAHY.

References Cited in the file of this patent

UNITED STATES PATENTS

| Number | Name | Date |
|---|---|---|
| 107,034 | Gardiner | Sept. 6, 1870 |
| 1,544,032 | Potez | June 30, 1925 |
| 1,871,390 | Reynolds | Aug. 9, 1932 |
| 2,230,029 | Eaton | Jan. 28, 1941 |
| 2,463,373 | Gadbois | Mar. 1, 1949 |